United States Patent
Langhammer

(10) Patent No.: US 10,037,189 B2
(45) Date of Patent: Jul. 31, 2018

(54) DISTRIBUTED DOUBLE-PRECISION FLOATING-POINT MULTIPLICATION

(71) Applicant: Altera Corporation, San Jose, CA (US)

(72) Inventor: Martin Langhammer, Salisbury (GB)

(73) Assignee: ALTERA CORPORATION, San Jose, CA (US)

( * ) Notice: Subject to any disclaimer, the term of this patent is extended or adjusted under 35 U.S.C. 154(b) by 20 days.

(21) Appl. No.: 15/270,153

(22) Filed: Sep. 20, 2016

(65) Prior Publication Data
US 2018/0081631 A1    Mar. 22, 2018

(51) Int. Cl.
G06F 7/44    (2006.01)
G06F 7/487    (2006.01)

(52) U.S. Cl.
CPC ................... *G06F 7/4876* (2013.01)

(58) Field of Classification Search
CPC ....................................... G06F 7/4876
USPC ................. 708/503, 524, 620, 625
See application file for complete search history.

(56) References Cited

U.S. PATENT DOCUMENTS

| | | | |
|---|---|---|---|
| 4,722,068 A | 1/1988 | Kuroda et al. | |
| 6,647,404 B2 | 11/2003 | Tzeng et al. | |
| 7,275,076 B2 | 9/2007 | Talwar et al. | |
| 8,959,137 B1 * | 2/2015 | Langhammer | G06F 7/5324 708/620 |
| 9,098,332 B1 | 8/2015 | Langhammer | |
| 2012/0151191 A1 | 6/2012 | Boswell et al. | |
| 2014/0006467 A1 | 1/2014 | Samudrala et al. | |
| 2015/0081753 A1 * | 3/2015 | Iyer | G06F 7/525 708/523 |

OTHER PUBLICATIONS

PCT International Search Report for PCT Application No. PCT/US2017/044082 dated Nov. 8, 2017; 11 Pages.

* cited by examiner

*Primary Examiner* — Tan V. Mai
(74) *Attorney, Agent, or Firm* — Fletcher Yoder, P.C.

(57) ABSTRACT

The present embodiments relate to circuitry that efficiently performs double-precision floating-point multiplication operations, single-precision floating-point multiplication operations, and fixed-point multiplication operations. Such circuitry may be implemented in specialized processing blocks. If desired, each specialized processing block efficiently may perform a single-precision floating-point multiplication operation, and multiple specialized processing blocks may be coupled together to perform a double-precision floating-point multiplication operation. Inter-block signaling circuits may generate rounding information and propagate the rounding information together with partial product results from a current specialized processing block to another specialized processing block.

20 Claims, 10 Drawing Sheets

DISTRIBUTED DOUBLE-PRECISION FLOATING-POINT MULTIPLICATION

BACKGROUND

The present embodiments relate to integrated circuits and, more particularly, to performing double-precision floating-point multiplication operations using specialized processing blocks in an integrated circuit.

As applications increase in complexity, it has become more common to include specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits and register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits sold by Altera Corporation, of San Jose, Calif., as part of the STRATIX® and ARRIA® families include specialized processing blocks, each of which includes a plurality of multipliers. Each of those specialized processing blocks also includes adders and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, they would be construct outside the specialized processing block using general-purpose programmable logic of the device, or using a combination of the fixed-point operators inside the specialized processing block with additional logic in the general-purpose programmable logic.

SUMMARY

Double-precision floating-point multiplication circuitry that performs a double-precision floating-point multiplication of first and second double-precision floating-point numbers may include first and second specialized processing blocks. The first specialized processing block may generate a first bit and a first partial result of the double-precision floating-point multiplication. The second specialized processing block may include a first arithmetic operator circuit that computes a product of a first portion of the first double-precision floating-point number and a second portion of the second double-precision floating-point number, a second arithmetic operator circuit that computes a sum of the product and the first partial result, and an inter-block signaling circuit that generates a second bit and a second partial result based on the sum, and a third bit based on the sum and the first bit.

In certain embodiments, the above mentioned inter-block signaling circuit may include a logical OR gate that performs a logical OR operation of a subset of bits from the sum to generate a fourth bit.

If desired, the inter-block signaling circuit may further include an additional logical OR gate that performs a logical OR operation of the first and fourth bits to generate a fifth bit and a multiplexer that selects the third bit among the first bit, the fourth bit, and the fifth bit.

It is appreciated that the embodiments described herein can be implemented in numerous ways, such as a process, an apparatus, a system, a device, or a method executed on a processing machine. Several inventive embodiments are described below.

In certain embodiments, the above mentioned double-precision floating-point multiplication circuitry may further include a third specialized processing block that is configurable to select between performing a fixed-point operation, a single-precision floating-point operation, and a double-precision floating-point operation.

If desired, the third specialized processing block may include a third arithmetic operator circuit that computes an additional product of the first portion of the first double-precision floating-point number and a third portion of the second double-precision floating-point number.

In some embodiments, the above mentioned third specialized processing block may further include a fourth arithmetic operator circuit that receives the second bit, the second partial result, and the third bit from the second specialized processing block and the additional product from the third arithmetic operator circuit, simultaneously computes a plurality of results, and selects a result among the plurality of results based on the second bit and the third bit.

Further features of the invention, its nature and various advantages, will be apparent from the accompanying drawings and the following detailed description of the preferred embodiments.

DETAILED DESCRIPTION

The present embodiments provided herein relate to integrated circuits and, more particularly, to performing double-precision floating-point multiplication operations using specialized processing blocks in an integrated circuit.

Specialized processing blocks that perform arithmetic operations may be used in digital signal processing (DSP) applications (e.g., to process video signals, audio signals, etc.). Such specialized processing blocks often include a plurality of multipliers, adders, registers, and programmable connectors (e.g., multiplexers) that allow the various components of the specialized processing block to be configured in different ways.

Typically, the arithmetic operators (adders and multipliers) in such specialized processing blocks have been fixed-point operators. If floating-point operators were needed, they would be construct outside the specialized processing block (e.g., using additional logic in the integrated circuit, or using a combination of the fixed-point operators inside the specialized processing block with additional logic in the integrated circuit).

However, as applications increase in complexity, the use of floating-point operators, and in particular the use of double-precision floating-point operators, has become more common. Consequently, it is desirable to provide a specialized processing that is adaptable to efficiently implement fixed-point operations, single-precision floating-point operations, and double-precision floating-point operations.

It will be recognized by one skilled in the art, that the present exemplary embodiments may be practiced without some or all of these specific details. In other instances, well-known operations have not been described in detail in order not to unnecessarily obscure the present embodiments.

Figure 1:
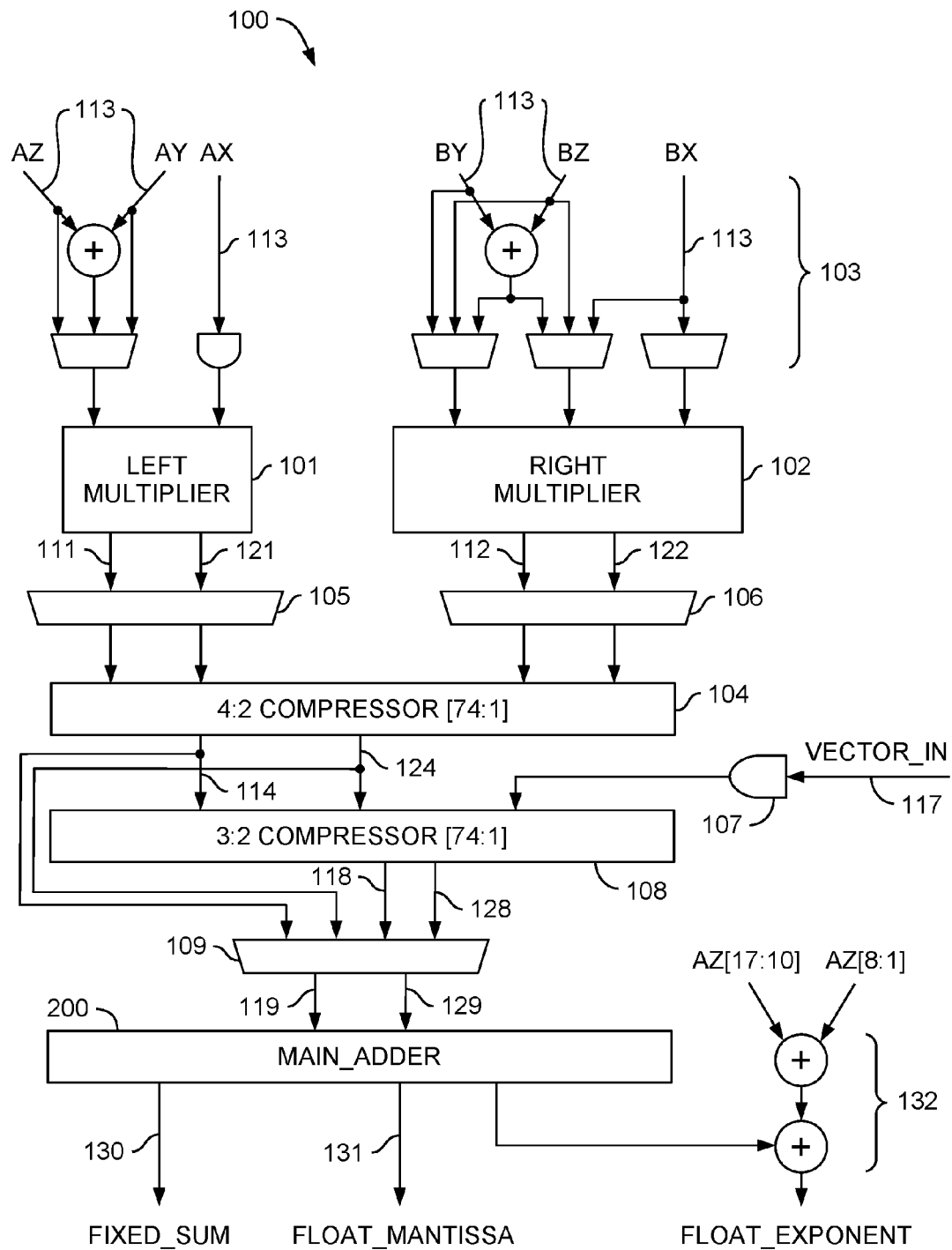
FIG. 1 is a diagram of an illustrative specialized processing block for performing either fixed-point, single-precision floating-point, or double-precision floating-point operations in accordance with an embodiment.

An illustrative embodiment of a specialized processing block 100 that is adaptable to efficiently implement fixed-point operations and floating-point operations is shown in FIG. 1.

In this logical representation, implementation details, such as registers and some programmable routing features, such as multiplexers that may allow the output of a particular structure to be routed around certain components or directly out of the specialized processing block, are omitted to simplify discussion.

In the logical representation of FIG. 1, "left multiplier" 101 is a partial product generator such as an 18×18 partial product generator, which may be used, e.g., as two 9×18 partial product generators, if desired. Left multiplier 101 may produce two dimensionless output vectors 111, 121. Similarly, "right multiplier" 102 is a partial product generator such as an 18×18 partial product generator, which may be used, e.g., as a 18×9 partial product generator and a 27×9 partial product generator. Right multiplier 102 may produce two dimensionless output vectors 112, 122.

Together, left multiplier 101 and right multiplier 102 may implement a 27×27 partial product generator to support single-precision floating-point multiplication, which under the IEEE 754-1985 standard has a mantissa size of 23 bits (exclusive of an implied leading '1'). Input multiplexer stage 103 may combine and align between four and six inputs 113 according to the needs of a particular user logic design.

Multiplexers 105, 106 may align vectors 111, 121, 121, and 122, respectively, according to the type of operation being performed, as determined by a user design, if desired. Specifically, vectors 111, 112, 121, and 122 may be totally offset from one another (e.g., to perform two separate smaller multiplications, such as two 9×9 multiplications), totally aligned with one another (e.g., to perform one larger multiplication, such as one 18×18 multiplication), or partially aligned with one another (e.g., to perform a "rectangular" multiplication, such as a 9×18 multiplication).

4:2 compressor 104 may combine the four dimensionless output vectors 111, 112, 121, and 122 into two dimensionless output vectors 114 and 124. If desired, each of the input and output vectors of 4:2 compressor 104 may be up to 74 bits wide.

Specialized processing block 100 may receive another vector 117 from another specialized processing block. 3:2 compressor 108 may receive vector 117, along with vectors 114 and 124 and provide vectors 118 and 128. Multiplexer 109 may select between vectors 114, 124 and vectors 118, 128, allowing 3:2 compressor 108 to be bypassed if cascade input 117 is not used. AND gate 107 may set input 117 to zero when, for example, the structure is being used in an accumulator mode and the accumulator has to be reset.

Output vectors 119 and 129 may each be up to 74 bits wide and are input to main adder 200 to provide the resultant product of the multiplication operation, which can be a fixed-point output 130 or a floating-point output 131. In a floating-point case, the exponent may be handled at 132.

When multiplying two floating-point numbers according to the IEEE 754-1985 standard, the input multiplicands are normalized numbers between decimal 1.0 and decimal 1.999 . . . . Therefore, the resultant product can be between decimal 1.0 and decimal 3.999 . . . , and may be subject to normalization and rounding.

To accommodate normalization and rounding, it may be necessary to add either zero, one or two to the least significant bit(s) of the result (which may be referred to as the sum).

Specifically, normalization may involve a right shift of zero bits or one bit (if the result is greater than or equal to decimal 1.0 and less than decimal 2.0, the right shift is zero bits; if the result is greater than or equal to decimal 2.0 and less than decimal 4.0 the right shift is one bit). In cases where rounding is not applied, whether the normalization is 0 bit or 1 bit, the sum-plus-zero (i.e., the sum) may be used. In cases where rounding is applied, then if the normalization is zero bits, the sum-plus-1 may be used, while if the normalization is one bit, the sum-plus-2 may be used.

Therefore, in accordance with embodiments, and as described in more detail below, those three quantities (sum, sum-plus-1 and sum-plus-2) are generated simultaneously using different portions of the circuitry, and then one of the three quantities is selected as the final result using a signal (e.g., a carry signal) from another portion of the calculation, thereby eliminating the need to wait for the other portion of the calculation before generating the appropriate result (i.e., sum, sum-plus-1 or sum-plus-2).

In one embodiment, generating the three results simultaneously is accomplished by decomposing adder 200 into two adders (e.g., low adder 410 and a middle adder 420 of FIG. 4), which may be used together to perform a single fixed-point addition (e.g., adding two 74-bit numbers), a single-precision floating-point multiplication, or a double-precision floating-point multiplication.

Figure 2:
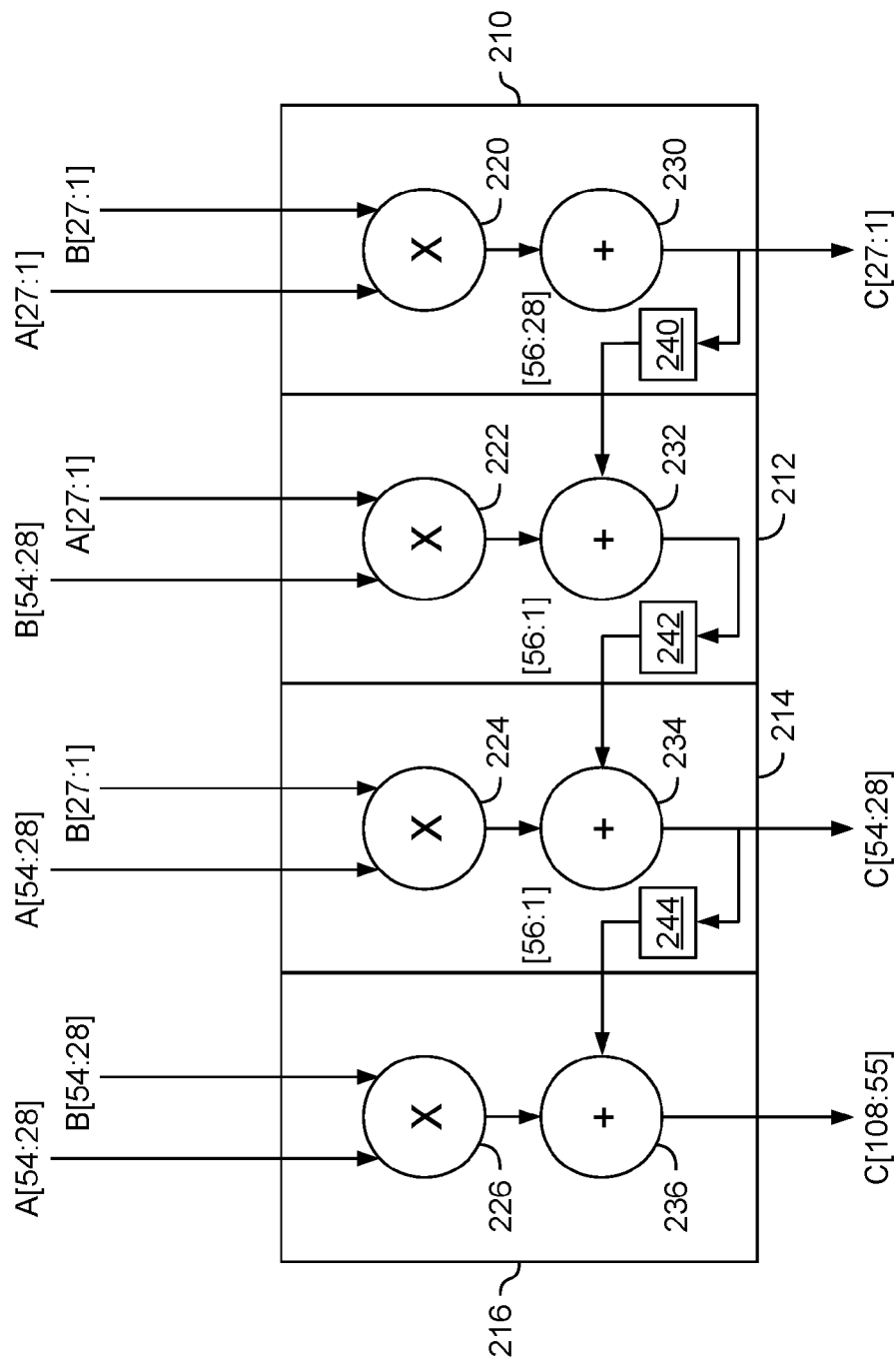
FIG. 2 is a diagram of an illustrative plurality of specialized processing blocks arranged in a cascade chain that performs a double-precision floating-point multiplication of first and second double-precision floating-point numbers in accordance with an embodiment.

If desired, a plurality of specialized processing blocks may implement together a double-precision floating-point multiplication of first and second double-precision floating-point numbers. As an example, FIG. 2 shows four specialized processing blocks 210, 212, 214, and 216 that are arranged in a cascade chain and perform a double-precision floating-point multiplication of double-precision floating-point numbers A and B.

In some embodiments, one or more specialized processing blocks of specialized processing blocks 210, 212, 214, and 216 may be identical. For example, specialized processing block 100 of FIG. 1 may implement specialized processing blocks 210, 212, 214, and 216. In this example, four identical specialized processing blocks may each be configured differently such that the configured specialized processing blocks implement the respective functionality of specialized processing blocks 210, 212, 214, and 216 of FIG. 2.

If desired, specialized processing blocks 210, 212, 214, and 216 may be arranged in a row or a column. If desired, a row or a column may include more than four specialized processing blocks. In the example in which four identical specialized processing blocks are configured differently to implement the functionality of specialized processing blocks 210, 212, 214, and 216, any subset of four neighboring specialized processing blocks in a row or a column may implement a double-precision floating-point multiplication. If desired, an integrated circuit may include one or more rows or columns of specialized processing blocks.

Double-precision floating-point numbers A and B may have 54-bit mantissas, and each specialized processing block 210, 212, 214, and 216 may receive a respective portion of double-precision floating-point numbers A and B. For example, specialized processing block 210 may receive the 27 least significant bits (LSBs) of A and B (i.e., A[27:1] and B[27:1]), specialized processing block 212 may receive the 27 least significant bits (LSBs) of A and the 27 most significant bits (MSBs) of B (i.e., A[27:1] and B[54:28]), specialized processing block 214 may receive the 27 most significant bits (MSBs) of A and the 27 least significant bits (LSBs) of B (i.e., A[54:28] and B[27:1]), and specialized processing block 216 may receive the 27 most significant bits (MSBs) of A and B (i.e., A[54:28] and B[54:28]).

If desired, specialized processing blocks 210, 212, 214, and 216 may each include a first arithmetic operator circuit 220, 222, 224, and 226 and a second arithmetic operator circuit 230, 232, 234, and 236. Specialized processing blocks 210, 212, and 214 may include inter-block signaling circuits 240, 242, and 244. If desired, specialized processing block 216 may also include an inter-block signaling circuit (not shown).

The first arithmetic operator circuit of each specialized processing block may generate a partial product of the respective portions of the first and second double-precision floating-point numbers. For example, multiplier 220 may generate the partial product of the 27 least significant bits (LSBs) of A and B (i.e., A[27:1] and B[27:1]), multiplier 222 may generate the partial product of the 27 least significant bits (LSBs) of A and the 27 most significant bits (MSBs) of B (i.e., A[27:1] and B[54:28]), multiplier 224 may generate the partial product of the 27 most significant bits (MSBs) of A and the 27 least significant bits (LSBs) of B (i.e., A[54:28] and B[27:1]), and multiplier 226 may generate the partial product of the 27 most significant bits (MSBs) of A and B (i.e., A[54:28] and B[54:28]).

The second arithmetic operator circuit of each specialized processing block may generate a combined partial product by combining the partial product from the first arithmetic operator circuit with another combined partial product from a neighboring specialized processing block of the plurality of specialized processing blocks that is arranged upstream in the cascade chain.

For example, second arithmetic operator circuit 232 of specialized processing block 212 may generate a combined partial product by combining the partial product from first arithmetic operator circuit 222 and the combined partial product from specialized processing block 210. Similarly, second arithmetic operator circuit 234 of specialized processing block 214 may generate a combined partial product by combining the partial product from first arithmetic operator circuit 224 and the combined partial product from specialized processing block 212; and second arithmetic operator circuit 236 of specialized processing block 216 may generate a combined partial product by combining the partial product from first arithmetic operator circuit 226 and the combined partial product from specialized processing block 214.

Each specialized processing block may output ranges of the combined partial product as a range of the double-precision floating-point multiplication result C. For example, specialized processing block 210 may output the 27 LSBs (i.e., C[27:1]) of the double-precision floating-point multiplication result. Similarly, specialized processing blocks 214 and 216 may output the next 27 bits (i.e., C[54:28]) and the 54 MSBs (i.e., C[108:55]) of the double-precision floating-point multiplication result, respectively.

The inter-block signaling circuit may select a portion of the respective combined partial product generated by the respective second arithmetic operator circuit for the neighboring specialized processing block of the plurality of specialized processing block that is arranged downstream in the cascade chain.

For example, inter-block signaling circuit 240 of specialized processing block 210 may select the 29 MSB (i.e., bits [56:28]) of the combined partial product generated by second arithmetic operator circuit 230 and send the selected bits to specialized processing block 212. Similarly, inter-block signaling circuit 242 of specialized processing block 212 may select all 56 bits (i.e., bits [56:1]) of the combined partial product generated by second arithmetic operator circuit 232 and send the selected bits to specialized processing block 214; and inter-block signaling circuit 244 of specialized processing block 214 may select all 56 bits (i.e., bits [56:1]) of the combined partial product generated by second arithmetic operator circuit 234 and send the selected bits to specialized processing block 216.

If desired, the inter-block signaling circuit of each specialized processing block may generate a sticky bit and a round bit for the neighboring specialized processing block of the plurality of specialized processing blocks that is arranged downstream in the cascade chain.

For example, inter-block signaling circuit 240 of specialized processing block 210 may generate a sticky bit and a round bit for specialized processing block 212, inter-block signaling circuit 242 of specialized processing block 212 may generate a sticky bit and a round bit for specialized processing block 214, and inter-block signaling circuit 244 of specialized processing block 214 may generate a sticky bit and a round bit for specialized processing block 216.

Figure 3:
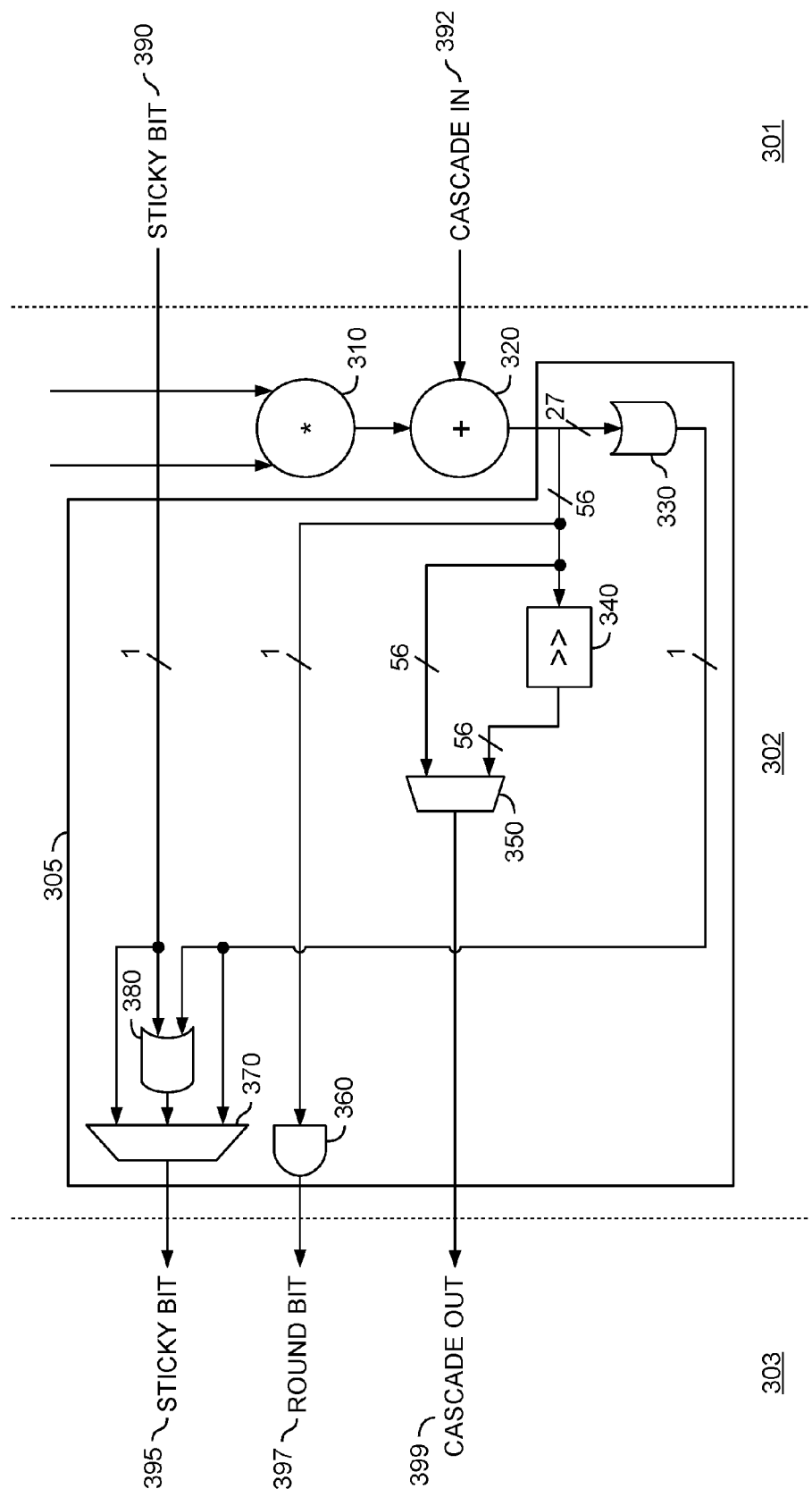
FIG. 3 is a diagram of an illustrative specialized processing block with a multiplier circuit, an adder circuit, and an inter-block signaling circuit in accordance with an embodiment.

FIG. 3 is a diagram of an illustrative specialized processing block 302 with first and second arithmetic circuits 310 and 320 and inter-block signaling circuit 305 in accordance with an embodiment. As shown, specialized processing circuit 302 may receive respective portions of first and second double-precision floating-point numbers, sticky bit 390 and cascade-in signal 392 from neighboring specialized processing block 301 and provide sticky bit 395, round bit 397, and cascade-out signal 399 to neighboring specialized processing block 303.

If desired, first arithmetic operator circuit 310 and second arithmetic operator circuit 320 may be configured to implement a multiplication and an addition operation, respectively. In this configuration, first arithmetic operator circuit 310 may compute a product of the respective portions of the first and second double-precision floating-point numbers and provide the product to second arithmetic operator circuit 320. Second arithmetic operator circuit 320 may compute a sum of the product and cascade-in signal 392, and provide the sum to inter-block signaling circuit 305.

As shown, inter-block signaling circuit 305 may include logical OR gates 330 and 380, multiplexers 350 and 370, logical AND gate 360, and right shifter 340.

Right shifter 340 may receive the sum signal and shift the sum signal a predetermined number of bits to the right. For example, right shifter 340 may receive a sum signal that includes 56 bits and shift the sum signal 27 bits to the right, thereby generating a right shifted sum signal that has 27 bits of zero followed by the 29 MSBs of the sum signal as the 29 LSBs of the right shifted sum signal.

Multiplexer 350 may receive the sum signal and the right shifted sum signal and generate cascade out signal 399 by selecting between the sum signal and the right shifted sum signal. If desired, the selection may be based on the position of specialized processing block 302 within a cascade chain of specialized processing blocks that perform a double-precision floating-point multiplication operation (e.g., whether specialized processing block 302 implements specialized processing block 210, 212, or 214 of FIG. 2). For example, specialized processing block 210 may generate cascade out signal 399 by selecting the right shifted sum signal, and specialized processing blocks 212 and 214 may both generate cascade out signal 399 by selecting the sum signal.

Logical OR gate 330 may receive a portion of the sum signal and generate a first additional sticky bit by performing a logical OR function of a predetermined number of LSBs of the sum signal. For example, logical OR gate 330 may receive the 27 LSBs of the sum signal and perform a logical OR function of the 27 LSBs of the sum signal to generate the first additional sticky bit.

Logical OR gate 380 may generate a second additional sticky bit by performing a logical OR function of sticky bit 390 and the first additional sticky bit from logical OR gate 330.

Multiplexer 370 may receive sticky bit 390 and first and second additional sticky bits and generate sticky bit 395 by selecting between sticky bit 390 and first and second additional sticky bits. If desired, the selection may be based on the position of specialized processing block 302 within a cascade chain of specialized processing blocks that perform a double-precision floating-point multiplication operation (e.g., whether specialized processing block 302 implements specialized processing block 210, 212, or 214 of FIG. 2). For example, specialized processing block 210 of FIG. 2 may output the first additional sticky bit, specialized processing block 212 may output sticky bit 390 from specialized processing block 210, and specialized processing block 214 may output the second additional sticky bit.

Inter-block signaling circuit 305 may generate round bit 397 by providing one bit of the sum signal through logical AND gate 360 to neighboring specialized processing block 303. Logical AND gate 360 may selectively set round bit 397 to zero based on the position of specialized processing block 302 within a cascade chain of specialized processing blocks that perform a double-precision floating-point multiplication operation (e.g., whether specialized processing block 302 implements specialized processing block 210, 212, 214, or 216 of FIG. 2). For example, logical AND gate 360 may set round bit 397 to zero if inter-block signaling circuit 305 is in specialized processing blocks 210, 212, and 216 of FIG. 2. Logical AND gate 360 may output one bit of the sum signal in specialized processing block 214.

As shown above, to accommodate normalization and rounding, it may be necessary to add either zero, one, or decimal two to the least significant bit(s) of the result. Specifically, in cases where rounding is not applied, whether the normalization is zero bits or one bit, a sum-plus-zero signal (i.e., the sum signal) may be used. In cases where rounding is applied, then if the normalization is zero bits, a sum-plus-1 signal (i.e., a one added to the sum signal) may be used, while if the normalization is one bit, a sum-plus-2 signal (i.e., a decimal two added to the sum signal) may be used.

If desired, different portions of a specialized processing block such as specialized processing block 305 may generate those three signals (i.e., sum signal, sum-plus-1 signal, and sum-plus-2 signal) simultaneously, and then select between these three signals using a control signal from another portion of the specialized processing block, thereby parallelizing portions of the double-precision floating-point multiplication operation.

Figure 4:
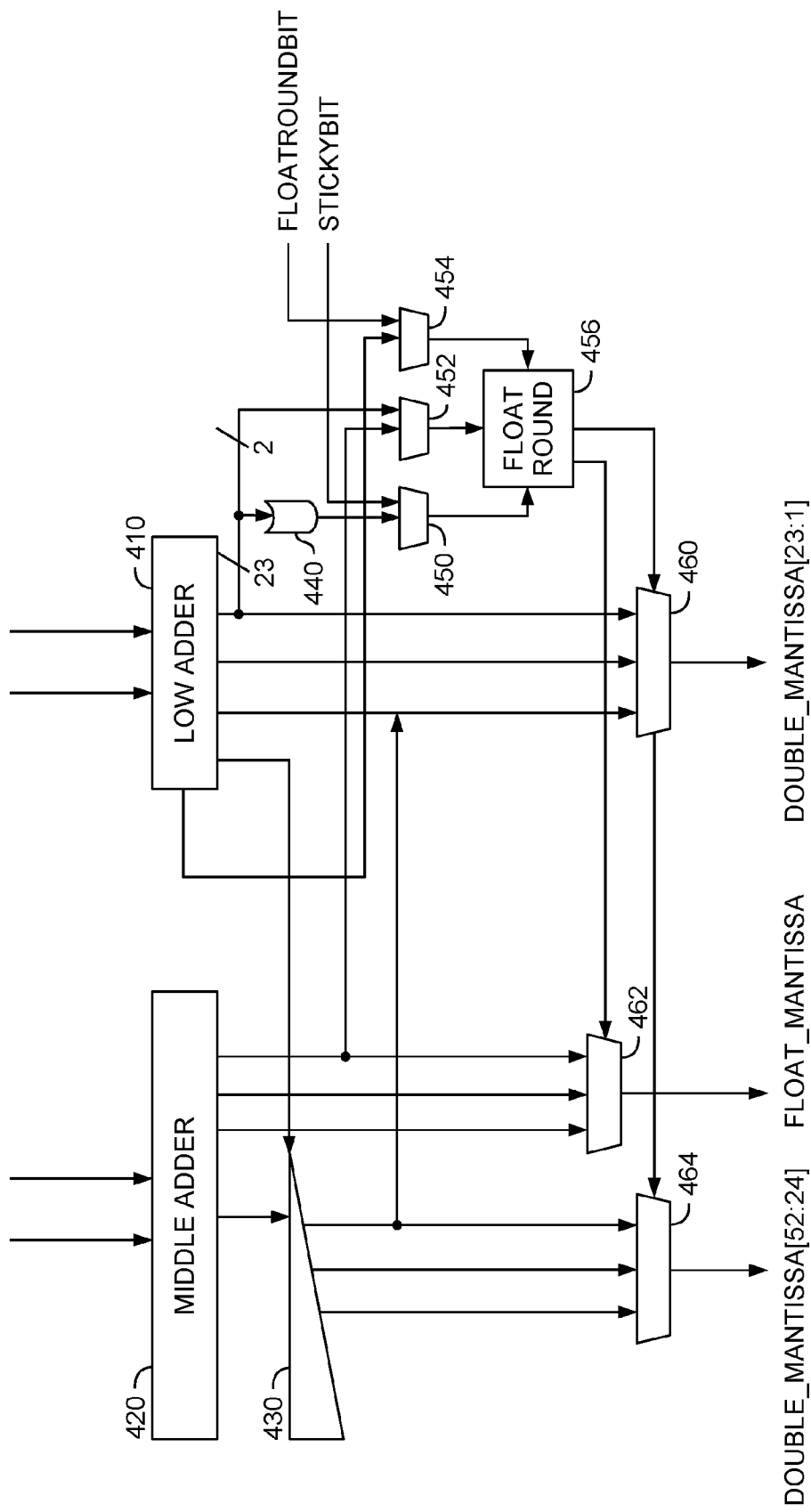
FIG. 4 is a diagram of illustrative arithmetic operator circuit that performs single- and double-precision floating-point rounding in a specialized processing block in accordance with an embodiment.

An embodiment of circuitry that simultaneously computes the sum signal, the sum-plus-one signal, and the sum-plus-two signal and then selects between these three signals to determine the result of a single-precision floating-point operation or a double-precision floating-point operation is shown in FIG. 4. If desired, the circuitry of FIG. 4 may replace adder 200 of FIG. 1.

As shown, the circuitry of FIG. 4 includes low adder 410, middle adder 420, prefix network 430, logical OR gate 440, float round circuit 456, and multiplexers 450, 452, 454, 460, 462, and 464, and may implement a fixed-point operation (e.g., a single fixed-point addition operation or two separate fixed-point addition operations), a single-precision floating-point operation (e.g., rounding for a single-precision floating-point multiplication operation), or a double-precision floating-point operation (e.g., a double-precision floating-point multiplication operation).

Low adder 410 and/or middle adder 420 may receive portions of partial products computed by additional circuitry (e.g., 4:2 compressor 104 of FIG. 1). As an example, middle adder 420 may receive the partial products when performing in single-precision floating-point multiplication operation, generate the sum-plus-zero signal, the sum-plus-one signal, and the sum-plus-two signal of the single-precision floating-point multiplication result, and provide these three signals to multiplexer 462.

As another example, low adder 410 and middle adder 420 may receive the LSBs and the MSBs of partial products of a double-precision floating-point multiplication operation, respectively. Low adder 410 may generate the sum-plus-zero signal, the sum-plus-one signal, and the sum-plus-two signal for the LSBs of the double-precision floating-point multiplication result, and provide these three signals to multiplexer 460.

Middle adder 420 may compute the sum of the MSBs of the partial products and provide the sum to prefix network 430. Prefix network 430 may then generate the sum-plus-zero signal, the sum-plus-one signal, and the sum-plus-two signal for the MSBs of the double-precision floating-point multiplication result based on the sum signal from middle adder 420 and the MSB of the sum signal from low adder 410, and provide these three signals to multiplexer 464.

Float round circuit 456 may generate a control signal that selects between the respective sum-plus-zero signal, sum-plus-one signal, and sum-plus-two signal at multiplexers 460, 462, and 464 based on signals received from multiplexers 450, 452, and 454.

Logical OR gate 440 may generate a round-to-nearest-even signal by performing a logical OR function of the 23 LSBs of the sum-plus-zero signal from low adder 410 to determine the presence of a one in any bit location, signifying, when the highest bit from low adder 410 is a one, whether the result from low adder 410 is exactly decimal 0.5 or greater than decimal 0.5.

As shown, multiplexer 454 may receive a float round bit (e.g., round bit 397 of FIG. 3 from a neighboring specialized processing block) and the carry bit from low adder 410, multiplexer 452 may receive the lowermost bits from middle adder 420 and the lowermost bits from low adder 410, and multiplexer 450 may receive a sticky bit (e.g., sticky bit 390 of FIG. 3 from a neighboring specialized processing block) and the round-to-nearest-even signal from logical OR gate 440.

When the circuitry of FIG. 4 is configured to implement a single-precision floating-point rounding operation, multiplexer 454 may select the carry bit from low adder 410, multiplexer 452 the lowermost bits from middle adder 420, and multiplexer 450 the round-to-nearest-even signal from logical OR gate 440, whereas when the circuitry of FIG. 4 is configured to implement a double-precision floating-point rounding operation, multiplexer 454 may select the float round bit, multiplexer 452 the lowermost bits of the sum-plus-zero signal from low adder 410, and multiplexer 450 the sticky bit.

Figure 5:
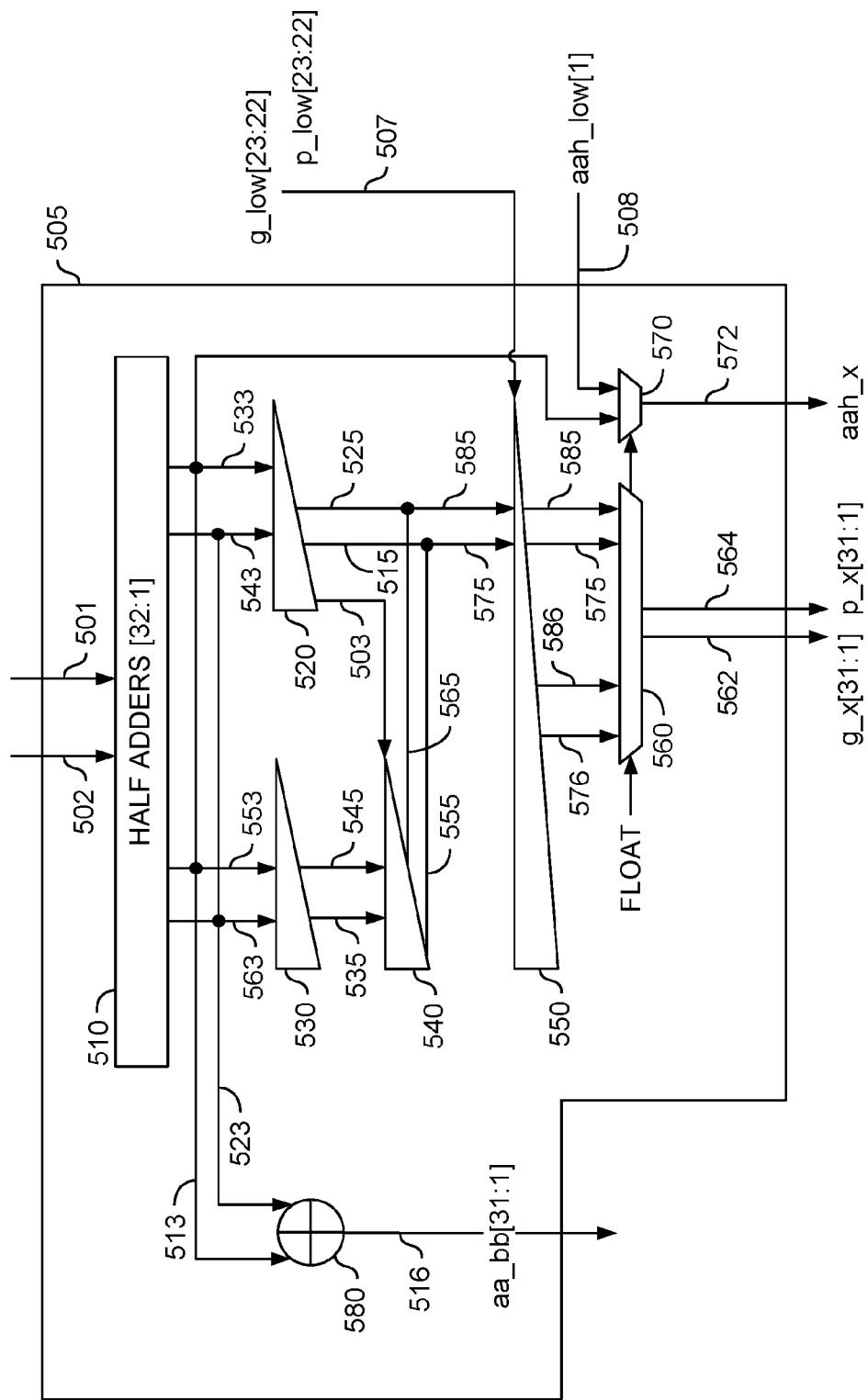
FIG. 5 is a diagram of illustrative arithmetic operator circuitry including a half-adder with two parallel prefix network trees in accordance with an embodiment.

An embodiment of a circuit 505 that may implement a portion of the circuitry that generates sum-plus-zero, sum-plus-one, and sum-plus-two signals is shown in FIG. 5. As shown, half adders 510 of circuit 505 may receive signals 501 and 502, which may include 31-bit portions of partial products of a floating-point multiplication operation (e.g., the partial products computed by 4:2 compressor 104 of FIG. 1 or the MSBs of partial products of a double-precision floating-point multiplication operation).

Circuit 505 may perform fixed-point, single-precision floating-point, and double-precision floating-point operations and support up to 31 bits of precision. In some embodiments, circuit 505 may exclusively perform single-precision and/or double-precision floating-point operations and support fewer bits of precision. For example, half adders 510 may include 23 half adders instead of the shown 32 half adders if circuit 505 performs exclusively single-precision floating-point operations. If desired, half adders 510 may include 27 half adders instead of the shown 32 half adders if circuit 505 performs single-precision and double-precision floating-point operations.

As shown, half adder 510 may generate two 32-bit signals, which may be referred to as half-add-sum 513 and half-add-carry 523. Half-add-sum 513 may be the 31-bit result of the bitwise logical XOR operation of signals 501 and 502; the 32nd bit is not used. Half-add-carry 523 may be a 32-bit signal resulting from a 1-bit left-shift of the bitwise logical AND operation of signals 501 and 502. In single-precision floating-point operation mode, a zero may be inserted in the least-significant bit position of half-add-carry 523, whereas the most-significant bit from low adder 410 of FIG. 4 may be inserted in double-precision floating-point operation mode, if desired.

In some embodiments, signals 513 and 523 may be divided into lower 14 bits (i.e., signals 533 and 543) and upper 17 bits (i.e., signals 553 and 563), respectively. Half adder 510 may provide signals 533, 543, 553, and 563 to a first parallel prefix network tree, which may include prefix networks 520, 530, and 540. Each prefix network of prefix networks 520, 530, and 540 may be, for example, a Kogge-Stone prefix network or any other prefix network such as a Brent-Kung prefix network or a Han Carlson prefix network, just to name a few. Each prefix network of prefix networks 520, 530, and 540 may output respective generate and propagate vectors.

For example, prefix network 520 may receive signals 533 and 543 and provide 14-bit generate signal 515 and 14-bit propagate signal 525, and prefix network 530 may receive signals 553 and 563 and provide 17-bit generate signal 535 and 17-bit propagate signal 545 to prefix network 540. Prefix network 540 may also receive the prefix (g, p) output 503 of the highest node of prefix network 520.

Prefix network 540 may provide generate signal 555 and propagate signal 565, which may be concatenated with generate signal 515 and propagate signal 525, respectively, to provide 31-bit single-precision generate signal 575 and 31-bit single-precision propagate signal 585.

A second parallel prefix network tree, which may include prefix network 550, may receive the 31-bit generate signal 575 and the 31-bit propagate signal 585. If desired, prefix network 550 may receive additional signals. For example, prefix network 550 may receive the prefix (g, p) output 507 of low adder 410 of FIG. 4 (i.e., signals g_low[23:22] and p_low[23:22]).

Prefix network 550 may be, for example, a Kogge-Stone prefix network or any other prefix network such as a Brent-Kung prefix network or a Han Carlson prefix network, just to name a few. Prefix network 550 may generate 31-bit double-precision generate signal 576 and 31-bit double-precision propagate signal 586 by incorporating the prefix (g, p) output 507 with the single-precision generate and propagate signals 575 and 585, using for each of the 31 bits a single logical AND gate and a single logical OR gate, respectively, if desired.

Multiplexer 560 may receive the double-precision generate and propagate signals 576 and 586, the single-precision generate and propagate signals 575 and 585, and a control signal (e.g., signal FLOAT). If desired, the control signal may indicate whether the specialized processing block is configured to perform a single-precision floating-point operation (e.g., signal FLOAT is equal to '1') or a double-precision floating-point operation (e.g., signal FLOAT is equal to '0').

For example, in response to indicating that the specialized processing block is configured to perform a single-precision floating-point operation, multiplexer 560 may select single-precision generate and propagate signals 575 and 585 as 31-bit generate and propagate signals 562 and 564 (i.e., signals g_x[31:1] and p_x[31:1]), respectively. In response to indicating that the specialized processing block is configured to perform a double-precision floating-point operation, multiplexer 560 may select double-precision generate and propagate signals 576 and 586 as 31-bit generate and propagate signals 562 and 564 (i.e., signals g_x[31:1] and p_x[31:1]), respectively.

If desired, logical exclusive OR gate 580, which is sometimes also referred to as logical XOR gate, XOR gate or XOR, may perform a logical XOR operation of half-add-sum signal 513 and half-add-carry signal 523 to provide signal 516 (i.e., signal aa_bb[31:1]).

Multiplexer 570 may receive the LSB of half-add-sum signal 513, the LSB of a corresponding signal 508 from low adder 410 of FIG. 4 (i.e., signal aah_low[1]), and a control signal (e.g., signal FLOAT). If desired, the control signal may indicate whether the specialized processing block is configured to perform a single-precision floating-point operation (e.g., signal FLOAT is equal to '1') or a double-precision floating-point operation (e.g., signal FLOAT is equal to '0').

For example, in response to indicating that the specialized processing block is configured to perform a single-precision floating-point operation, multiplexer 570 may select the LSB of half-add-sum as output signal 572 (i.e., aah_x). In response to indicating that the specialized processing block is configured to perform a double-precision floating-point operation, multiplexer 570 may select signal 508 (i.e., aah_low[1]) as output signal 572.

Circuit 505 may provide signals 516, 562, 564, and 572 to additional circuitry that generates sum-plus-zero, sum-plus-one, and sum-plus-two signals. Such circuitry may perform fixed-point, single-precision floating-point, and double-precision floating-point operations and therefore are computed to 31 bits of precision. However, in some embodiments the sum-plus-two and sum-plus-one signals may only be used for floating-point operations. In such an embodiment sum-plus-one and sum-plus-two signals may only be 29 bits wide.

Figure 6:
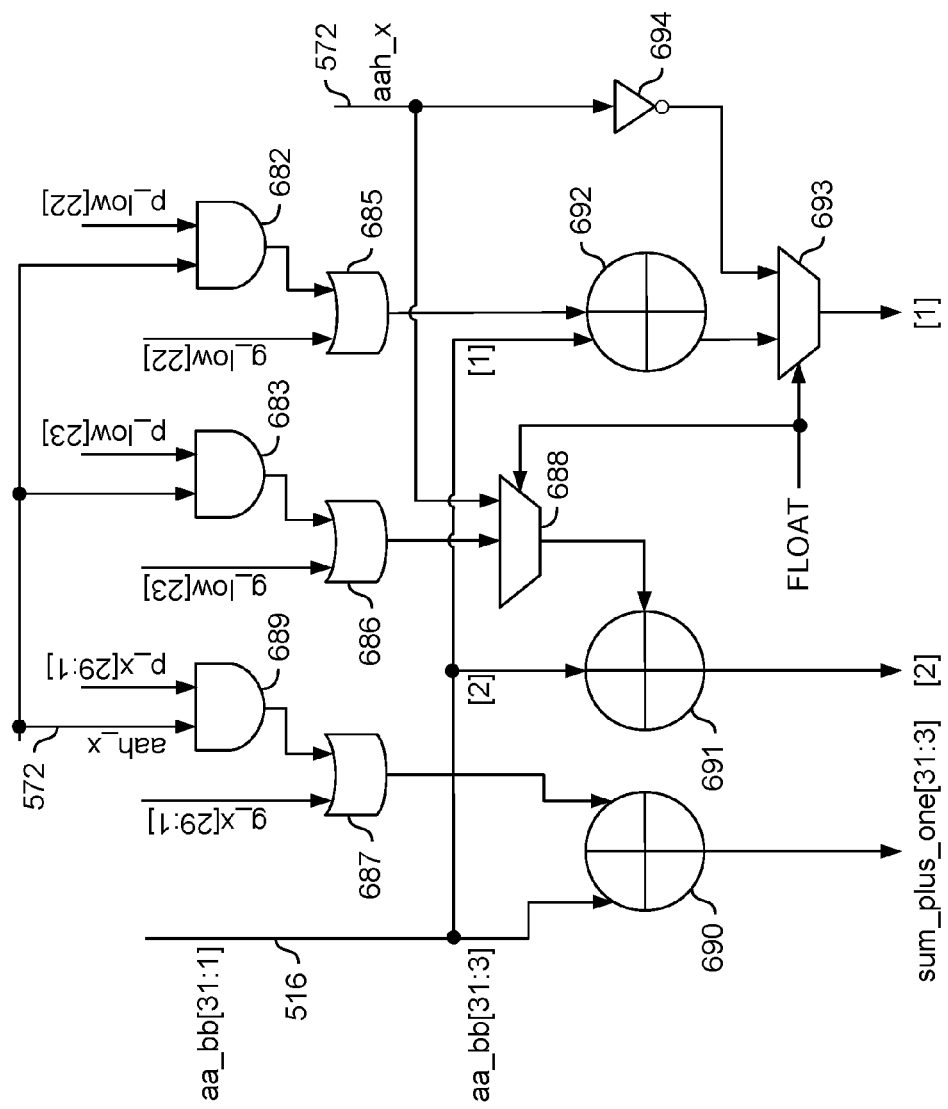
FIG. 6 is a diagram of illustrative arithmetic operator circuitry for computing sum-plus-one in accordance with an embodiment.

An embodiment of the circuitry that generates the sum-plus-one signal based on the signals generated by circuit 505 is shown in FIG. 6. As shown, the circuitry may include logical AND gates 682, 683, and 689, logical OR gates 685, 686 and 687, multiplexers 688 and 693, logical exclusive OR gates 690, 691, and 692, and inverter 694.

Logical AND gate 689 may perform the logical AND operation of signal 572 (i.e., aah_x) and the 29 LSBs of signal 564 (i.e., p_x[29:1]), logical OR gate 687 may perform the logical OR operation of the output of logical AND gate 689 and the 29 LSBs of signal 562 (i.e., g_x[29:1]), and logical exclusive OR gate 690 may perform the logical XOR operation of the output of logical OR gate 687 and the 29 MSBs of signal 516 (i.e., aa_bb[31:3]) to generate the 29 MSBs of the sum-plus-one signal (i.e., sum-plus-one[31:3]).

Logical AND gate 683 may perform the logical AND operation of signal 572 (i.e., aah_x) and bit 23 of the propagate portion of signal 507 (i.e., p_low[23]), and logical OR gate 686 may perform the logical OR operation of the output of logical AND gate 683 and bit 23 of the generate portion of signal 507 (i.e., g_low[23]). Multiplexer 688 may select the output of logical OR gate 686 when the specialized processing block performs a double-precision floating-point operation and signal 572 (i.e., aah_x) when the specialized processing block performs a single-precision floating-point operation. Logical exclusive OR gate 691 may perform the logical XOR operation of the output of multiplexer 688 and bit 2 of signal 516 (i.e., aa_bb[2]) to generate bit 2 of the sum-plus-one signal (i.e., sum-plus-one[2]).

Logical AND gate 682 may perform the logical AND operation of signal 572 (i.e., aah_x) and bit 22 of the propagate portion of signal 507 (i.e., p_low[22]), and logical OR gate 685 may perform the logical OR operation of the output of logical AND gate 682 and bit 22 of the generate portion of signal 507 (i.e., g_low[22]). Logical exclusive OR gate 692 may perform the logical XOR operation of the output of logical OR gate 685 and bit 1 of signal 516 (i.e., aa_bb[1]). Inverter 694 may invert signal 572 (i.e., aah_x), and multiplexer 693 may select the output of logical XOR gate 692 when the specialized processing block performs a double-precision floating-point operation and inverted signal 572 (i.e., NOT(aah_x)) when the specialized processing block performs a single-precision floating-point operation to generate bit 1 of the sum-plus-one signal (i.e., sum-plus-one[1]).

Figure 7:
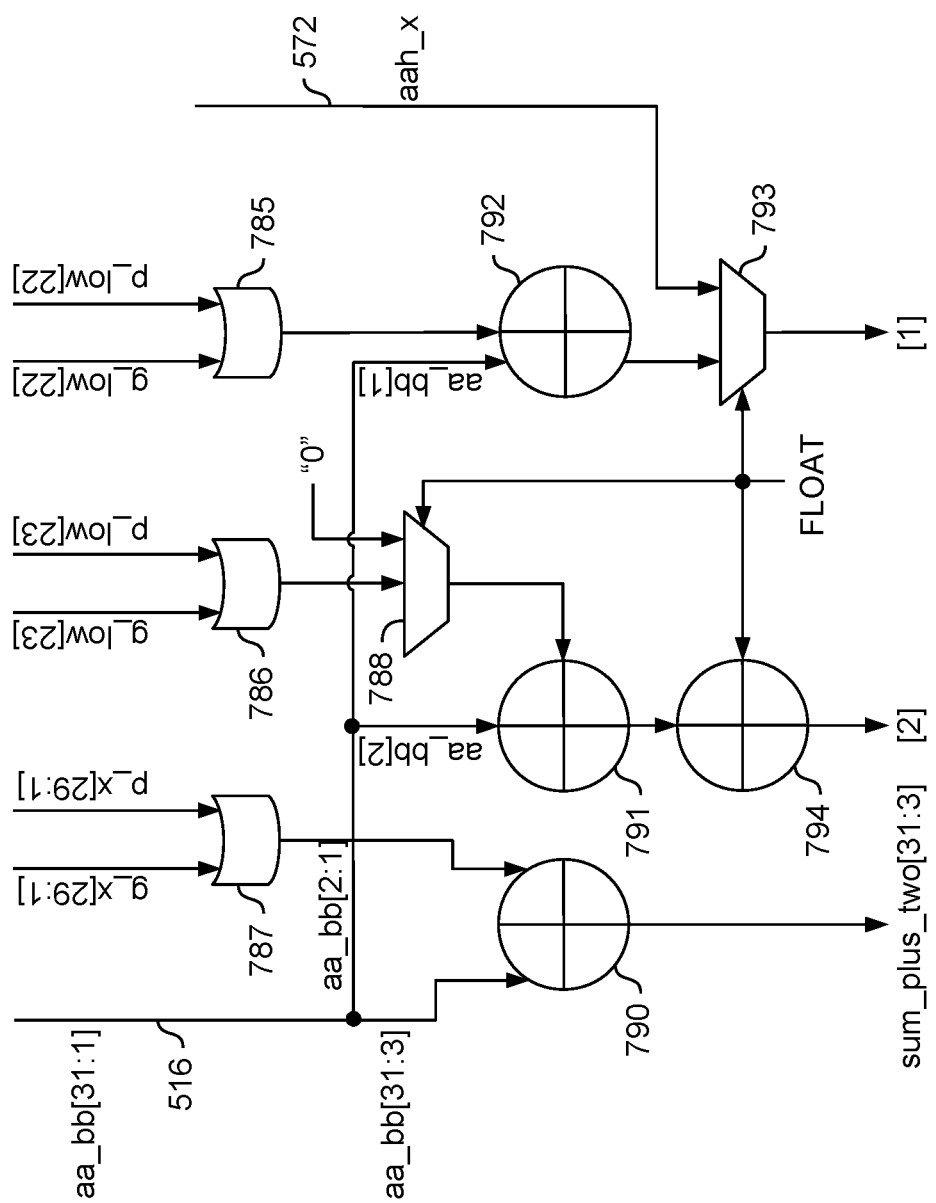
FIG. 7 is a diagram of illustrative arithmetic operator circuitry for computing sum-plus-two in accordance with an embodiment.

An embodiment of the circuitry that generates sum-plus-two based on the signals generated by circuit 505 is shown in FIG. 7. As shown, the circuitry may include logical OR gates 785, 786, and 787, multiplexers 788 and 793, and logical exclusive OR gates 790, 791, 792, and 794.

Logical OR gate 787 may perform the logical OR operation of the 29 LSBs of signals 562 and 564 (i.e., g_x[29:1] and p_x[29:1]), and logical exclusive OR gate 790 may perform the logical XOR operation of the output of logical OR gate 787 and the 29 MSBs of signal 516 (i.e., aa_bb[31:3]) to generate the 29 MSBs of the sum-plus-two signal (i.e., sum-plus-two[31:3]).

Logical OR gate 786 may perform the logical OR operation of bit 23 of the generate and propagate portions of signal 507 (i.e., g_low[23] and p_low[23]). Multiplexer 788 may select the output of logical OR gate 786 when the specialized processing block performs a double-precision floating-point operation and a constant zero when the specialized processing block performs a single-precision floating-point operation. Logical exclusive OR gate 791 may perform the logical XOR operation of the output of multiplexer 788 and bit 2 of signal 516 (i.e., aa_bb[2]). Logical exclusive OR gate 794 may perform the logical XOR operation of the output of logical exclusive OR gate 791 and a control signal (e.g., signal FLOAT).

Consider the scenario in which the control signal indicates whether the specialized processing block is configured to perform a single-precision floating-point operation (i.e., signal FLOAT is equal to '1') or a double-precision floating-point operation (i.e., signal FLOAT is equal to '0'). In this scenario, the logical exclusive OR gate 794 may invert the output of logical exclusive OR gate 791 to generate bit 2 of the sum-plus-two signal (i.e., sum-plus-two[2]) when the specialized processing block is configured to perform a single-precision floating-point operation and provide the output of logical exclusive OR gate 791 as bit 2 of the sum-plus-two signal (i.e., sum-plus-two[2]) when the specialized processing block is configured to perform a double-precision floating-point operation.

Logical OR gate 785 may perform the logical OR operation of bit 22 of the generate and propagate portions of signal 507 (i.e., g_low[22] and p_low[22]). Logical exclusive OR gate 792 may perform the logical XOR operation of the output of logical OR gate 785 and bit 1 of signal 516 (i.e., aa_bb[1]). Multiplexer 793 may select the output of logical exclusive OR gate 792 when the specialized processing block performs a double-precision floating-point operation and signal 572 (i.e., aah_x) when the specialized processing block performs a single-precision floating-point operation to generate bit 1 of the sum-plus-two signal (i.e., sum-plus-two[1]).

Figure 8:
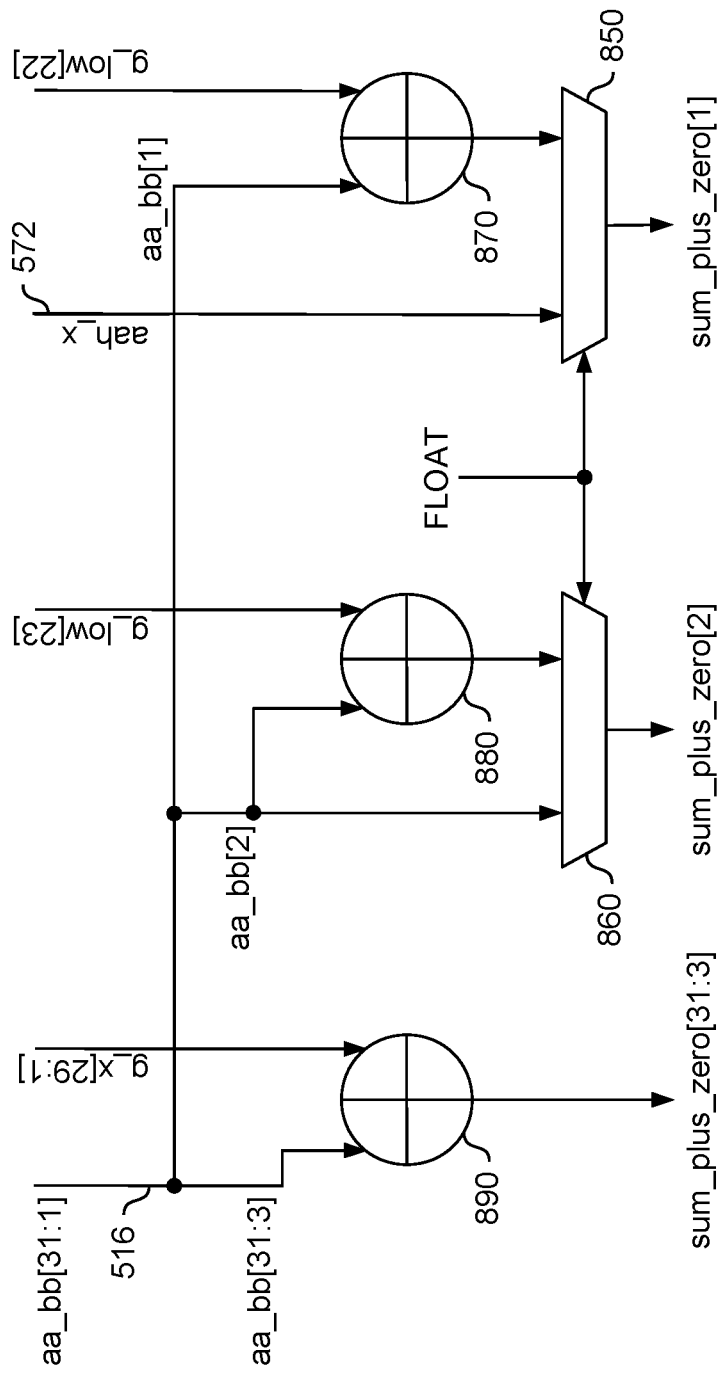
FIG. 8 is a diagram of illustrative arithmetic operator circuitry for computing sum-plus-zero in accordance with an embodiment.

An embodiment of the circuitry that generates sum-plus-zero based on the signals generated by circuit 505 is shown in FIG. 8. As shown, the circuitry may include multiplexers 850 and 860 and logical exclusive OR gates 870, 880, and 890.

Logical exclusive OR gate 890 may perform the logical XOR operation of the 29 LSBs of signal 562 (i.e., g_x[29:1]) and the 29 MSBs of signal 516 (i.e., aa_bb[31:3]) to generate the 29 MSBs of the sum-plus-zero signal (i.e., sum-plus-zero[31:3]).

Logical exclusive OR gate 880 may perform the logical XOR operation of bit 23 of the generate portion of signal 507 (i.e., g_low[23]) and bit 2 of signal 516 (i.e., aa_bb[2]). Multiplexer 860 may select the output of logical exclusive OR gate 880 when the specialized processing block performs a double-precision floating-point operation and bit 2 of signal 516 (i.e., aa_bb[2]) when the specialized processing block performs a single-precision floating-point operation to generate bit 2 of the sum-plus-zero signal (i.e., sum-plus-zero[2]).

Logical exclusive OR gate 870 may perform the logical XOR operation of bit 22 of the generate portion of signal 507 (i.e., g_low[22]) and bit 1 of signal 516 (i.e., aa_bb[1]). Multiplexer 850 may select the output of logical exclusive OR gate 870 when the specialized processing block performs a double-precision floating-point operation and signal 572 (i.e., aah_x) when the specialized processing block performs a single-precision floating-point operation to generate bit 1 of the sum-plus-zero signal (i.e., sum-plus-zero [1]).

Figure 9:
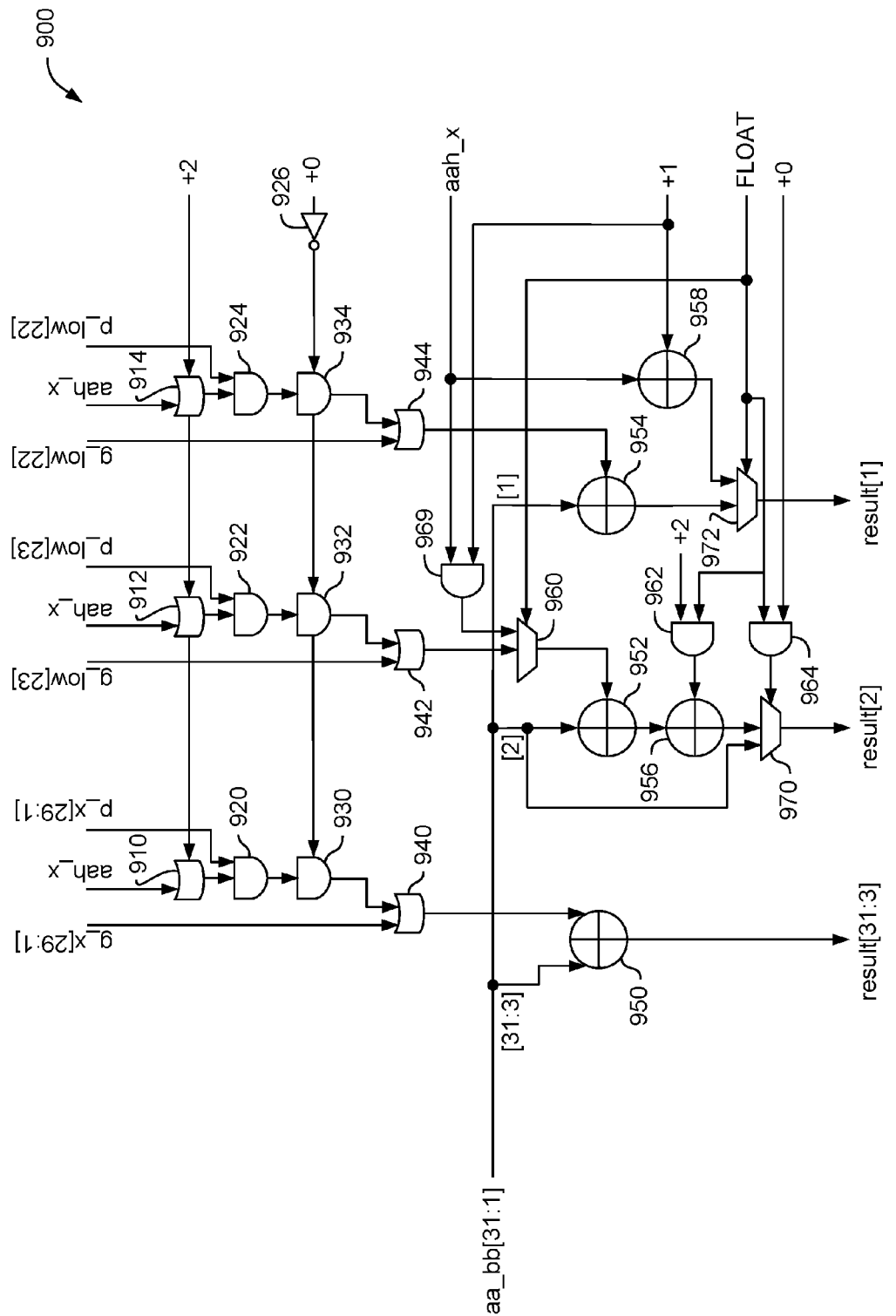
FIG. 9 is a diagram of illustrative arithmetic operator circuitry for computing and selecting among sum-plus-zero, sum-plus-one, and sum-plus-one in accordance with an embodiment.

If desired, the circuitry that generates the sum-plus-one signal of FIG. 6, the sum-plus-two signal of FIG. 7, and the sum-plus-zero signal of FIG. 8 may be combined into a single circuit. An embodiment of such a circuit is shown as circuit 900 in FIG. 9. As shown, circuit 900 may include inverter 926, logical OR gates 910, 912, 914, 940, 942, and 944, logical AND gates 920, 922, 924, 930, 932, 934, 962, 964, and 969, logical exclusive OR gates 950, 952, 954, 956, and 958, and multiplexers 960, 970, and 972.

In addition to the signals generated by circuit 505 of FIG. 5 (i.e., signals 516, 562, 564, and 572), circuit 900 may receive signals 507, "FLOAT", "+0", "+1", and "+2". If desired, signal "FLOAT" may indicate whether circuit 900 performs a single-precision floating-point or a double-precision floating-point operation. For example, signal "FLOAT" may be one if circuit 900 is configured to perform a single-precision floating-point operation and zero if circuit 900 is configured to perform a double-precision floating-point operation.

Signals "+0", "+1", and "+2" may indicate whether circuit 900 generates the sum-plus-zero signal, the sum-plus-one signal, or the sum-plus-two signal, respectively. For example, signals "+0", "+1", and "+2" may be one if circuit 900 generates the sum-plus-zero signal, the sum-plus-one signal, and the sum-plus-two signal, respectively, and zero otherwise. In other words, signal "+0" may be one and signals "+1" and "+2" zero if circuit 900 generates the sum-plus-zero signal. Similarly, signal "+1" may be one and signals "+0" and "+2" zero if circuit 900 generates the sum-plus-one signal, and signal "+2" may be one and signals "+0" and "+1" zero if circuit 900 generates the sum-plus-two signal.

Consider the scenario in which circuit 900 generates the sum-plus-two signal for a floating-point operation. In this scenario, signals "+0", "+1", and "+2" may be set to '0', '0', and '1', respectively. Thus, the output of logical AND gate 969 may be '0', and the outputs of logical OR gates 910, 912, and 914 may be '1', which may result in propagating the 29 LSBs of signal 564 (i.e., p_x[29:1]), bit 23 of the propagate portion of signal 507 (i.e., p_low[23]), and bit 22 of the propagate portion of signal 507 (i.e., p_low[22]) from the respective inputs to outputs of logical AND gates 930, 932, and 934, respectively.

Thus, logical OR gate 940 may perform the logical OR operation of the 29 LSBs of signals 562 and 564 (i.e., g_x[29:1] and p_x[29:1]), and logical exclusive OR gate 950 may perform the logical XOR operation of the output of logical OR gate 940 and the 29 MSBs of signal 516 (i.e., aa_bb[31:3]) to generate the 29 MSBs of the result signal (i.e., result[31:3]), which is logically equivalent to the 29 MSBs of the sum-plus-two signal (i.e., sum-plus-two[31:3]) of FIG. 7.

Logical OR gate 942 may perform the logical OR operation of bit 23 of the generate and propagate portions of signal 507 (i.e., g_low[23] and p_low[23]). Multiplexer 960 may select the output of logical OR gate 942 when the specialized processing block performs a double-precision floating-point operation and the output of logical AND gate 969 (i.e., constant '0') when the specialized processing block performs a single-precision floating-point operation.

Logical exclusive OR gate 952 may perform the logical XOR operation of the output of multiplexer 960 and bit 2 of signal 516 (i.e., aa_bb[2]), and logical exclusive OR gate 956 may perform the logical XOR operation of the output of logical exclusive OR gate 952 and the output of logical AND gate 962. Logical AND gate 962 may be one when performing a single-precision floating-point operation and zero when performing a double-precision floating-point operation. Thus, bit 2 of the result signal (i.e., result[2]) may be the signal from logical exclusive OR gate 952 when performing a double-precision floating-point operation and the inverse of the signal from logical exclusive OR gate 952 when performing a single-precision floating-point operation, which is logically equivalent to bit 2 of the sum-plus-two signal (i.e., sum-plus-two[2]) of FIG. 7.

Logical OR gate 944 may perform the logical OR operation of bit 22 of the generate and propagate portions of signal 507 (i.e., g_low[22] and p_low[22]). Logical exclusive OR gate 954 may perform the logical XOR operation of the output of logical OR gate 944 and bit 1 of signal 516 (i.e., aa_bb[1]). Multiplexer 972 may select the output of logical XOR gate 954 when the specialized processing block performs a double-precision floating-point operation and the output of logical exclusive OR gate 958, which is signal 572 (i.e., aah_x) since "+1" is '0', when the specialized processing block performs a single-precision floating-point operation to generate bit 1 of the result signal, which is logically equivalent to bit 1 of the sum-plus-two signal (i.e., sum-plus-two[1]) of FIG. 7.

Consider the scenario in which circuit 900 generates the sum-plus-one signal for a floating-point operation. In this scenario, signals "+0", "+1", and "+2" may be set to '0', '1', and '0', respectively. Thus, logical OR gates 910, 912, and 914 may propagate the respective other signal than "+2" to logical AND gates 920, 922, and 924, respectively.

Thus, logical AND gate 920 may perform the logical AND operation of signal 572 (i.e., aah_x) and the 29 LSBs of signal 564 (i.e., p_x[29:1]), logical OR gate 940 may perform the logical OR operation of the output of logical AND gate 920 (since the output of inverter 926 is '1') and the 29 LSBs of signal 562 (i.e., g_x[29:1]), and logical exclusive OR gate 950 may perform the logical XOR operation of the output of logical OR gate 940 and the 29 MSBs of signal 516 (i.e., aa_bb[31:3]) to generate the 29 MSBs of the result signal (i.e., result[31:3]), which is logically equivalent to the sum-plus-one signal (i.e., sum-plus-one[31:3]) of FIG. 6.

Logical AND gate 922 may perform the logical AND operation of signal 572 (i.e., aah_x) and bit 23 of the propagate portion of signal 507 (i.e., p_low[23]), and logical OR gate 942 may perform the logical OR operation of the output of logical AND gate 922 and bit 23 of the generate portion of signal 507 (i.e., g_low[23]). Multiplexer 960 may select the output of logical OR gate 942 when the specialized processing block performs a double-precision floating-point operation and the output of logical AND gate 969, which may be signal 572 (i.e., aah_x) since "+1" is one, when the specialized processing block performs a single-precision floating-point operation. Logical exclusive OR gate 952 may perform the logical XOR operation of the output of multiplexer 960 and bit 2 of signal 516 (i.e., aa_bb[2]). Logical exclusive OR gate 956 may propagate the output of logical exclusive OR gate 952 (since "+2" is zero and thus the output of logical AND gate 962 is zero) to generate bit 2 of the result signal (i.e., result[2]), which is logically equivalent to the sum-plus-one signal (i.e., sum-plus-one[2]) of FIG. 6.

Logical AND gate 924 may perform the logical AND operation of signal 572 (i.e., aah_x]) and bit 22 of the propagate portion of signal 507 (i.e., p_low[22]), and logical OR gate 944 may perform the logical OR operation of the output of logical AND gate 924 and bit 22 of the generate portion of signal 507 (i.e., g_low[22]). Logical exclusive OR gate 954 may perform the logical XOR operation of the output of logical OR gate 944 and bit 1 of signal 516 (i.e., aa_bb[1]). Logical exclusive OR gate 958 may invert signal 572 (i.e., aah_x) since signal "+1" is one, and multiplexer 972 may select the output of logical XOR gate 954 when the specialized processing block performs a double-precision floating-point operation and inverted signal 572 (i.e., NOT (aah_x)) when the specialized processing block performs a single-precision floating-point operation to generate bit 1 of the result signal (i.e., result[1]), which is logically equivalent to the sum-plus-one signal (i.e., sum-plus-one[1]) of FIG. 6.

Consider the scenario in which circuit 900 generates the sum-plus-zero signal for a floating-point operation. In this scenario, signals "+0", "+1", and "+2" may be set to '1', '0', and '0', respectively. Thus, the output of inverter 926 may be '0', which may result in the outputs of logical AND gates 930, 932, and 934 being '0', which in turn may result in propagating the 29 LSBs of signal 562 (i.e., g_x[29:1]), bit 23 of the generate portion of signal 507 (i.e., g_low[23]), and bit 22 of the generate portion of signal 507 (i.e., g_low[22]) from the respective inputs to outputs of logical OR gates 940, 942, and 944, respectively.

Logical exclusive OR gate 950 may perform the logical XOR operation of the signal from logical OR gate 940 (i.e., g_x[29:1]) and the 29 MSBs of signal 516 (i.e., aa_bb[31:3]) to generate the 29 MSBs of the result signal (i.e., result[31:3]), which is logically equivalent to the sum-plus-zero signal (i.e., sum-plus-zero[31:3]) of FIG. 8.

Logical exclusive OR gate 952 may perform the logical XOR operation of bit 23 of the generate portion of signal 507 (i.e., g_low[23]) and bit 2 of signal 516 (i.e., aa_bb[2]). Multiplexer 960 may select the output of logical OR gate 942 when the specialized processing block performs a double-precision floating-point operation, and logical exclusive OR gate 952 may perform the logical XOR operation of the output of multiplexer 960 and bit 2 of signal 516 (i.e., aa_bb[2]). Logical exclusive OR gate 956 may propagate the output of logical exclusive OR gate 952 (since "+2" is zero and thus the output of logical AND gate 962 is zero) to multiplexer 970. Multiplexer 970 may select the output of logical exclusive OR gate 952 when the specialized processing block performs a double-precision floating-point operation and bit 2 of signal 516 (i.e., aa_bb[2]) when the specialized processing block performs a single-precision floating-point operation to generate bit 2 of the result signal (i.e., result[2]), which is logically equivalent to the sum-plus-zero signal (i.e., sum-plus-zero[2]) of FIG. 8.

Logical exclusive OR gate 954 may perform the logical XOR operation of the signal from logical OR gate 944 (i.e., bit 22 of the generate portion of signal 507 (i.e., g_low[22])) and bit 1 of signal 516 (i.e., aa_bb[1]). Multiplexer 972 may select the output of logical exclusive OR gate 954 when the specialized processing block performs a double-precision floating-point operation and signal 572 (i.e., aah_x) when the specialized processing block performs a single-precision floating-point operation to generate bit 1 of the result signal (i.e., result[1]), which is logically equivalent to the sum-plus-zero signal (i.e., sum-plus-zero[1]) of FIG. 8.

Figure 10:
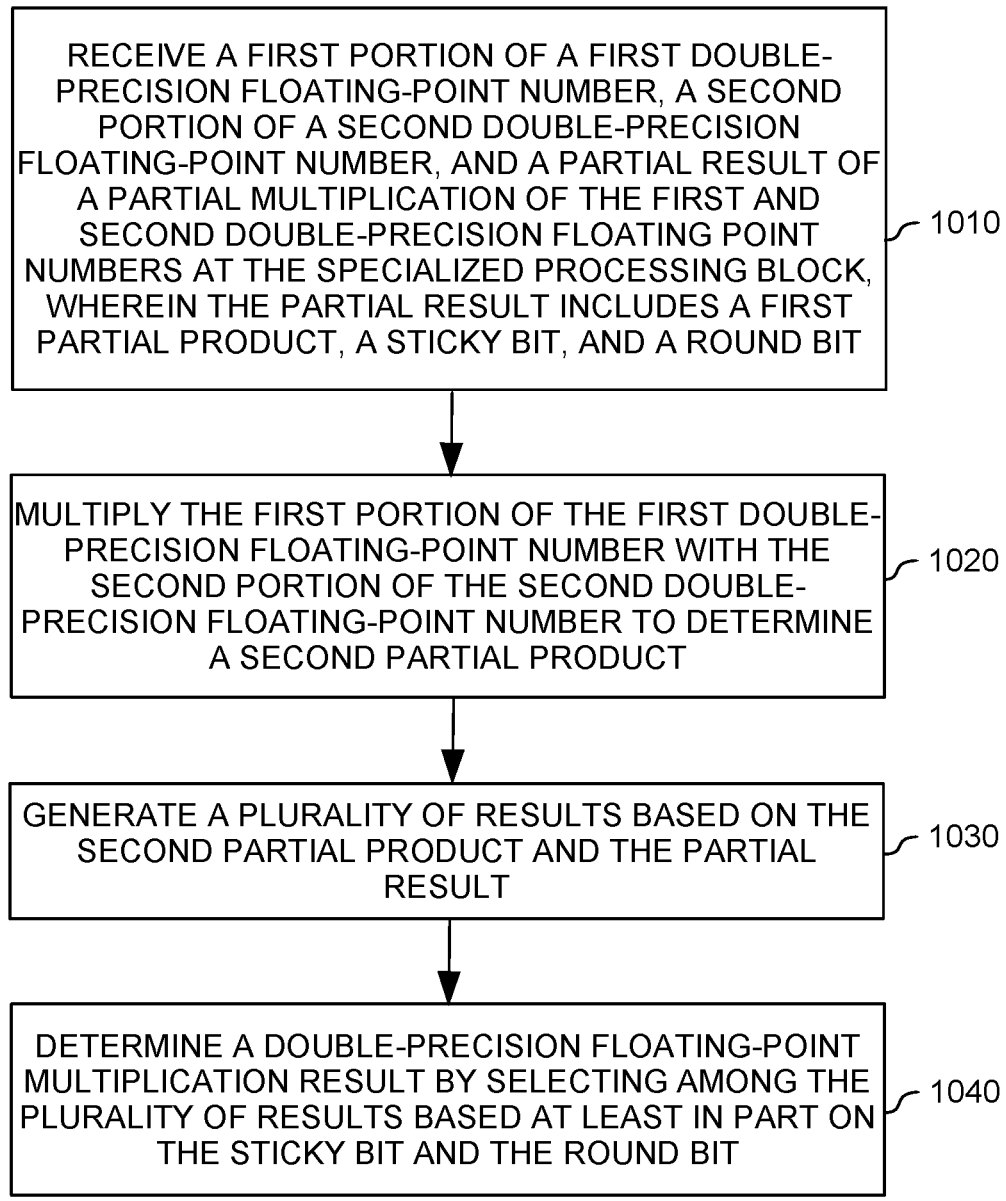
FIG. 10 is a diagram of a flow chart showing illustrative steps for operating a specialized processing block in accordance with an embodiment.

FIG. 10 is a diagram of a flow chart showing illustrative steps for operating a specialized processing block in accordance with an embodiment.

During operation 1010, the specialized processing block may receive a first portion of a first double-precision floating-point number, a second portion of a second double-precision floating-point number, and a partial result of a partial multiplication of the first and second double-precision floating point numbers at the specialized processing block, wherein the partial result includes a first partial product, a sticky bit, and a round bit.

For example, specialized processing block 216 of FIG. 2 may receive a portion of double-precision floating-point number A (e.g., signal A[54:28]), a portion of double-precision floating-point number B (e.g., signal B[54:28]), and a partial result from specialized processing block 214. The partial result may include the partial product computed by specialized processing block 214 as well as a sticky bit and a round bit that were generated by inter-block signaling circuit 244.

During operation 1020, the specialized processing block may multiply the first portion of the first double-precision floating-point number with the second portion of the second double-precision floating-point number to determine a second partial product. For example, multiplier 226 in specialized processing block 216 of FIG. 2 may multiply signal A[54:28] with signal B[54:28] to generate a second partial product.

During operation 1030, the specialized processing block may generate a plurality of results based on the second partial product and the partial result. For example, adder 236 in specialized processing block 216 of FIG. 2 may generate a sum-plus-zero signal, a sum-plus-one signal, and a sum-plus-two signal based on the output of multiplier 226 and the partial product from specialized processing block 214.

During operation 1040, the specialized processing block may determine a double-precision floating-point multiplication result by selecting among the plurality of results based at least in part on the sticky bit and the round bit. For example, specialized processing block 216 may select between the sum-plus-zero signal, the sum-plus-one signal, and the sum-plus-two signal based on the round bit and the sticky bit received from specialized processing block 214.

The method and apparatus described herein may be incorporated into any suitable circuit or system of circuits.

For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using circuitry that efficiently performs both, single-precision floating-point arithmetic operations and double-precision floating-point arithmetic operations, is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination. The above described embodiments are presented for purposes of illustration and not of limitation, and the present invention is limited only by the claims that follow.

What is claimed is:

1. Double-precision floating-point multiplication circuitry that performs a double-precision floating-point multiplication of first and second double-precision floating-point numbers, comprising:
    a first specialized processing block that generates a first bit and a first partial result of the double-precision floating-point multiplication; and
    a second specialized processing block that comprises:
        a first arithmetic operator circuit that computes a product of a first portion of the first double-precision floating-point number and a second portion of the second double-precision floating-point number,
        a second arithmetic operator circuit that computes a sum of the product and the first partial result, and
        an inter-block signaling circuit that generates a second bit and a second partial result based on the sum, and a third bit based on the sum and the first bit.

2. The double-precision floating-point multiplication circuitry of claim 1, wherein the inter-block signaling circuit further comprises:
    a logical OR gate that performs a logical OR operation of a subset of bits from the sum to generate a fourth bit.

3. The double-precision floating-point multiplication circuitry of claim 2, wherein the inter-block signaling circuit further comprises:
    an additional logical OR gate that performs a logical OR operation of the first and fourth bits to generate a fifth bit; and
    a multiplexer that selects the third bit among the first bit, the fourth bit, and the fifth bit.

4. The double-precision floating-point multiplication circuitry of claim 1, wherein the inter-block signaling circuit further comprises:
    a right shifter that shifts a subset of bits from the sum a predetermined number of bit positions to the right to generate a right shifted sum; and
    a multiplexer that selects the second partial result among the sum and the right shifted sum.

5. The double-precision floating-point multiplication circuitry of claim 1, further comprising:
    a third specialized processing block that is configurable to select between performing a fixed-point operation, a single-precision floating-point operation, and a double-precision floating-point operation.

6. The double-precision floating-point multiplication circuitry of claim 5, wherein the third specialized processing block further comprises:
    a third arithmetic operator circuit that computes an additional product of the first portion of the first double-precision floating-point number and a third portion of the second double-precision floating-point number.

7. The double-precision floating-point multiplication circuitry of claim 6, wherein the third specialized processing block further comprises:
    a fourth arithmetic operator circuit that receives the second bit, the second partial result, and the third bit from the second specialized processing block and the additional product from the third arithmetic operator circuit, simultaneously computes a plurality of results, and selects a result among the plurality of results based on the second bit and the third bit.

8. The double-precision floating-point multiplication circuitry of claim 7, wherein the fourth arithmetic operator circuit further comprises:
    a half-adder that computes a half-add-sum and a half-add-carry based on the additional product and the second partial result.

9. The double-precision floating-point multiplication circuitry of claim 8, wherein the fourth arithmetic operator circuit further comprises:
    a first parallel prefix network tree with three prefix networks that compute respective generate and propagate vectors based on the half-add-sum and the half-add-carry; and
    a second parallel prefix network tree with an additional prefix network that computes an additional generate and propagate vector based on at least one of the respective generate and propagate vectors.

10. A method for operating a specialized processing block, comprising:

receiving a first portion of a first double-precision floating-point number, a second portion of a second double-precision floating-point number, and a partial result of a partial multiplication of the first and second double-precision floating point numbers at the specialized processing block, wherein the partial result includes a first partial product, a sticky bit, and a round bit;

multiplying the first portion of the first double-precision floating-point number with the second portion of the second double-precision floating-point number to determine a second partial product;

generating a plurality of results based on the second partial product and the partial result; and determining a double-precision floating-point multiplication result by selecting among the plurality of results based at least in part on the sticky bit and the round bit.

11. The method of claim 10, wherein generating the plurality of results further comprises:

computing first, second, and third results of the plurality of results in parallel to anticipate rounding and normalization.

12. The method of claim 11, wherein computing first, second, and third results further comprises:

using a half-adder to compute a half-add-sum and a half-add-carry based on the first and second partial products; and using a two-level parallel prefix network tree with four prefix networks to compute respective generate and propagate vectors based on the half-add-sum and the half-add-carry.

13. The method of claim 11, further comprising:
determining whether rounding is applied.

14. The method of claim 13, further comprising:
in response to determining that rounding is not applied, selecting the first result of the plurality of results; and
in response to determining that rounding is applied, determining whether normalization is required.

15. The method of claim 14, further comprising:
in response to determining that normalization is not required, selecting the second result of the plurality of results; and
in response to determining that normalization is required, selecting the third result of the plurality of results.

16. An integrated circuit, comprising:
a plurality of specialized processing blocks arranged in a cascade chain that performs a double-precision floating-point multiplication of first and second double-precision floating-point numbers, wherein each specialized processing block of the plurality of specialized processing blocks receives respective portions of the first and second double-precision floating-point numbers, is configurable to perform a fixed-point multiplication, a single-precision floating-point multiplication, and a portion of the double-precision floating-point multiplication, and comprises:

a first arithmetic operator circuit that generates a partial product of the respective portions of the first and second double-precision floating-point numbers, a second arithmetic operator circuit that generates a combined partial product by combining the partial product from the first arithmetic operator circuit with another combined partial product from a first neighboring specialized processing block of the plurality of specialized processing blocks that is arranged upstream in the cascade chain, and an inter-block signaling circuit that generates a sticky bit and a round bit for a second neighboring specialized processing block of the plurality of specialized processing blocks that is arranged downstream in the cascade chain.

17. The integrated circuit of claim 16, wherein the second arithmetic operator circuit of each of the plurality of specialized processing blocks further comprises:

adder circuitry that simultaneously computes first, second, and third results based on the partial product from the first arithmetic circuit and the another combined partial product from the first neighboring specialized processing block.

18. The integrated circuit of claim 17, wherein the adder circuitry further comprises:

a half-adder that computes a half-add-sum and a half-add-carry based on the partial product from the first arithmetic circuit and the another combined partial product from the first neighboring specialized processing block.

19. The integrated circuit of claim 18, wherein the adder circuitry further comprises:

a first parallel prefix network tree with three prefix networks that compute respective generate and propagate vectors based on the half-add-sum and the half-add-carry; and a second parallel prefix network tree with an additional prefix network that computes an additional generate and propagate vector based on at least one of the respective generate and propagate vectors.

20. The integrated circuit of claim 17, wherein the second arithmetic operator circuit of each of the plurality of specialized processing blocks further comprises:

selection circuitry that selects between the first, second, and third results based on normalization requirements and the round bit and the sticky bit from the first neighboring specialized processing block.

* * * * *